Sept. 21, 1971   P. D. WEINER   3,606,664
LEAK-PROOF, THREADED CONNECTIONS
Filed April 4, 1969
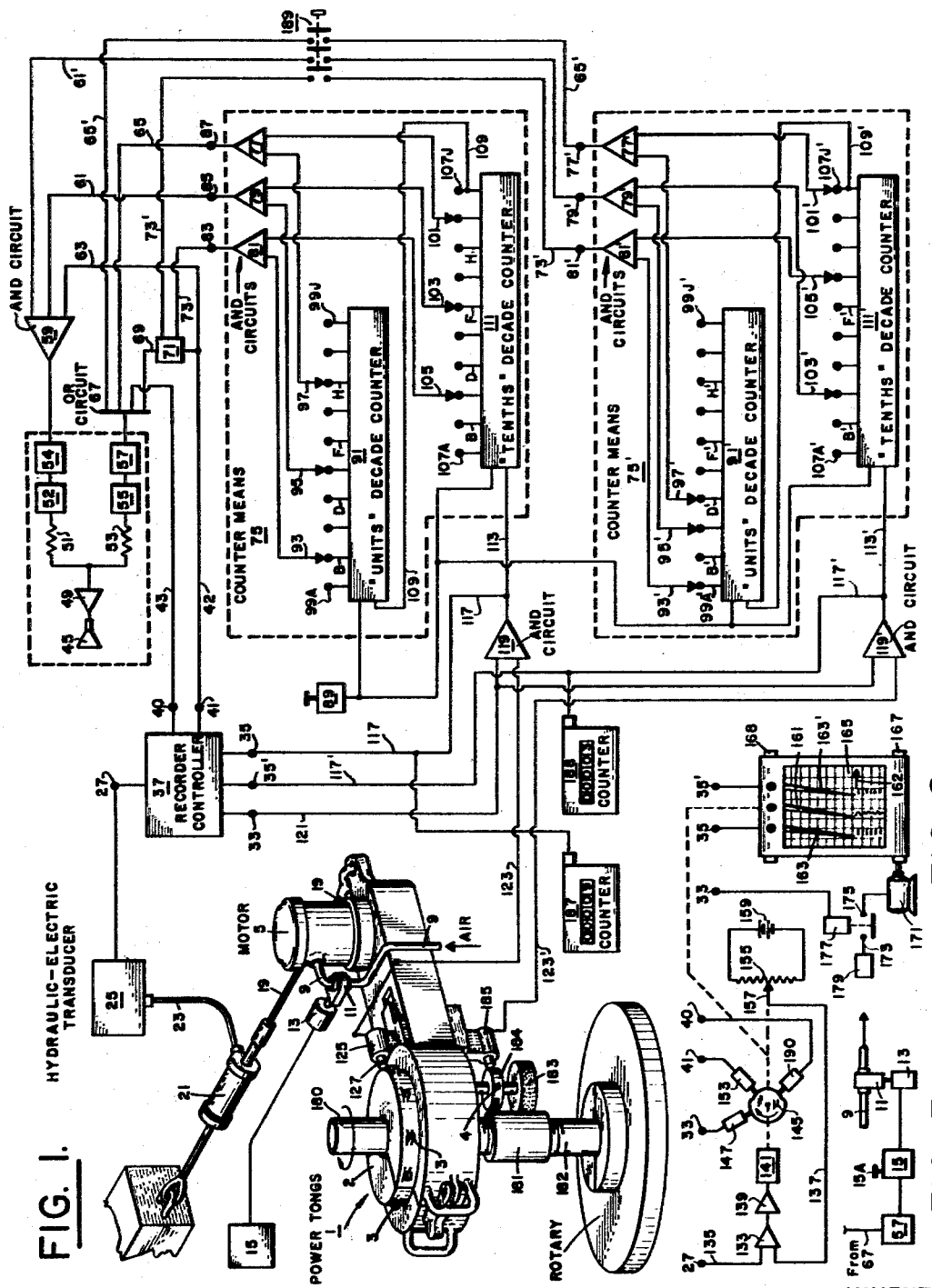
INVENTOR.
PETER D. WEINER,
BY *John L. Schneider*
ATTORNEY.

United States Patent Office 3,606,664
Patented Sept. 21, 1971

3,606,664
LEAK-PROOF THREADED CONNECTIONS
Peter D. Weiner, Bryan, Tex., assignor to
Esso Production Research Company
Filed Apr. 4, 1969, Ser. No. 813,573
Int. Cl. B23p 17/00
U.S. Cl. 29—400
17 Claims

ABSTRACT OF THE DISCLOSURE

Method and apparatus for obtaining leak-proof threaded pipe connections for either double-end makeup or single-end makeup. In each instance, one pipe section is rotated and the torque required for such rotation is measured and the number of turns of the rotated pipe section are counted. The number of turns of the coupling are also counted in double-end makeup. Signals indicative of such torques and turns are fed to apparatus for control of connection makeup.

FIELD OF THE INVENTION

The present invention concerns method and apparatus for obtaining leak-proof threaded tubular connections. More particularly, the invention concerns method and apparatus for controlling pipe makeup in which one pipe section is threadedly connected to another pipe section where the other pipe section may be a coupling (single-end makeup) and in which one pipe section is threadedly connected to one end of a coupling and another pipe section to the other end of the coupling (double-end makeup). The present invention is particularly useful in connecting well pipe sections and is applicable for both field and mill use.

DESCRIPTION OF THE PRIOR ART

The present invention is an improvement on the apparatus and method disclosed and claimed in U.S. Pat. No. 3,368,396, entitled, "Assuming Pipe Strings With Leak-Tight Joints," by G. G. Van Burkleo et al. In that patent, method and apparatus are described and claimed which are also capable of controlling tubular connection makeup. Such method and apparatus provide automatic measurement and control of both torque required to make up the connection and the turns of one of the pipe sections for single-end makeup.

SUMMARY OF THE INVENTION

A method for making up pipe sections having mating, threaded ends comprising threadedly interengaging said pipe section ends until a predetermined reference torque is required to further threadedly interengage said pipe section ends; thereafter further threadedly interengaging said pipe section ends; and discontinuing said further threaded interengagement of said pipe section ends upon occurrence of one of the following: (a) Attainment of a predetermined maximum number of turns before a predetermined minimum torque, greater than said reference torque, is reached; or (b) attainment of a predetermined maximum torque, greater than said minimum torque, before a predetermined intermediate number of turns, less than said maximum number of turns, is reached; or (c) attainment of said minimum torque before a predetermined number of low turns, less than said intermediate number of turns, is reached; or (d) attainment of said minimum torque on or after said intermediate number of turns is reached but before said maximum number of turns is reached; or (e) attainment of said intermediate number of turns on or after said minimum torque is reached but before said maximum torque is reached. The method also encompasses making up pipe sections to a coupling where the turns of the coupling are counted as well as the turns of the pipe section being rotated. The torque-turn control is capable of distinguishing between each pipe section (top and bottom of a floating coupling) makeup. The invention also includes apparatus for carrying out the method of the invention.

The apparatus may be set for either single-end makeup or for double-end makeup. The latter operation assures that both ends of the pipe sections are made up leak-proof when collars are floated on during field makeup. The control features of the apparatus may indicate automatically proper or improper makeup. When the minimum value of torque and turns fed into such apparatus have been satisfied, the makeup apparatus automatically releases the pipe and sounds a signal which indicates that the required specified conditions have been satisfied. If, for any reason, the connection is rejected, the pipe is also released automatically, a rejection signal is given and means may be provided for automatically marking the rejected joint. The makeup control setting for the apparatus includes reference, minimum and maximum torques and three "turns" setting controls. The turns setting controls are:

(1) Low—The turns which must be obtained before the minimum torque setting is attained to avoid improper (reject) makeup signal. This setting is a test for cross-threaded or worn-out connections.

(2) Minimum (or intermediate)—Turns that must be obtained for a satisfactory makeup.

(3) High (or maximum)—Turns that, if attained before minimum torque is reached, improper makeup signal is given. Such setting is a check for dirty or flat tapered connections.

The torque is set easily with the aid of a torque panel meter and three control knobs—one for the beginning reference torque, one for the maximum torque required for makeup, and the other for maximum allowable torque. The apparatus includes a strip-chart recorder which records the torque and turns makeup for each connection and a digital display of the turns during connection makeup. Since the apparatus permits tubular connections to be made up with double-end makeup (couplings floating) or with single-end makeup, the apparatus is controlled by an actuating switch on the control panel to designate the manner of makeup to be applied.

BRIEF DESCRIPTION OF THE DRAWINGS

FIG. 1 is a schematic diagram of the preferred embodiment of the invention;

FIG. 2 is a schematic diagram of a recorder controller for use in the apparatus of FIG. 1; and FIG. 3 is a schematic diagram of a modification of the apparatus of FIG. 1.

DESCRIPTION OF PREFERRED EMBODIMENT

With reference to FIG. 1, there is shown power tongs 1 having a rotatable jaw member 2 for gripping and rotating a well pipe string section, such as pipe section 180. The lower end of pipe section 180 is shown threaded into a pipe coupling 181 to which is also threaded the upper end of another pipe section 182. A bottom wheel 183 frictionally engages and rides on the outer surface of couplings 181. The travel of coupling 181 causes bottom wheel 183 and an actuator wheel 184 mounted on a common shaft with wheel 183 to rotate. A tong motor 5 which may be energized either by compressed air (as shown) or pressurized hydraulic fluid or electric motor is connected to tongs 1 by a drive mechanism in the conventional manner. A pipe 9, provided with a valve 11 for controlling air flow through pipe 9, is connected to motor 5 and to a source of compressed air (not shown). An energizing relay 13 operated by mechanical control means 15 actuates valve 11. Apparatus for measuring the torque exerted by the rotary jaw member 2 on well pipe 180 may be incorporated in the tong apparatus according to a number of techniques. For example, a tong torque measuring instrument such as described in the Composite Catalog of Oil Field Equipment and Services, 23d Rev., P. 3192, may be incorporated in the back-up line 19 connected to tong apparatus 1. This instrument provides a hydraulic output signal indicative of the torque exerted by the rotatable jaw member, which torque is proportional to the strain in the back-up line 19. The rotary jaw member 2 and actuator wheel 184 are provided with a number of lugs or projections 3 and 4, respectively, for purposes that will be described below. The hydraulic output signal from tong torque measuring instrument 21 is in the form of a hydraulic signal or force in a line 23 connecting the instrument 21 to a hydraulic-electric transducer 25. The function of transducer 25 is to produce an electrical output signal indicative of or proportional to the hydraulic signal transmitted thereto on line 23. Transducer 25 may be any of a number of types known to the art, such as a Bourdon tube for actuating an electrical resistor, the resistor being connected to a standard voltage source by means of a fixed resistor in series circuit relationship therewith. The signal appearing across the fixed resistor will be indicative of the hydraulic signal applied to the Bourdon tube. Such an apparatus may be a pressure transmitter such as is manufactured by International Resistance Company, 401 North Broad St., Philadelphia, Pa., and designated Model 70–2006. The output signal of transducer 25 is applied to input terminal 27 of recorder controller 37. The function of recorder controller 37 is to provide an output signal at terminal 33 when a reference torque signal of a predetermined magnitude applied to terminal 27 is reached and to produce an output signal at terminal 41 when a minimum torque signal of a predetermined magnitude larger than the reference torque signal applied to terminal 27 is reached, and to produce an output signal at terminal 40 when a maximum torque signal of a predetermined magnitude larger than the minimum torque signal applied to terminal 27 is reached and to provide a recording of the torque produced by tongs 1. Recorder controller 37 also records the number of turns through which the tongs 1 turn a particular well pipe as well as the number of turns made by a particular coupling. Suitable apparatus for this purpose is described below in connection with FIG. 2. In addition, a suitable apparatus is manufactured by the F. L. Mosely Company of Pasadena, Calif., and designated as Model 680. Recording controllers 187 and 188 also record the well pipe turns and the coupling turns, respectively.

Referring to FIG. 2, there is illustrated a recording mechanism including a strip chart 165, rollers 167 and 168 for supporting and moving the strip chart, a motor 171 connected to roller 167 by a mechanical connection 169 for rotating roller 167, a source of power 179 for energizing motor 171. Alternatively, a drum type of strip chart drive may be used. A relay 177 having a contact 175 in line 173 connects source 179 to motor 171 for the purpose of selectively energizing and de-energizing motor 171. Terminal means 33 is connected to the actuating winding of relay 177 so that an electric signal applied thereto will energize the winding to close contact 175.

Styli 161 and 163 and 163' engage strip chart 165 for the purpose of marking data traces on the strip chart. Styli 163 and 163' mark chart 165 in accordance with electrical pulses applied thereto through terminal means 35 and 35', respectively. Stylus 161 produces a continuous trace on chart 165. Stylus 161 is moved laterally of the direction of chart movement by a mechanical connection 143 from servo motor 141, the lateral excursions being in accordance with the position of the servo motor. The servo motor 141 is controlled in accordance with signals applied thereto from transducer 25 through terminal 27, differential amplifier 133, and servo amplifier 139.

The output signal of transducer 25 is applied to differential amplifier 133 by line 135. Amplifier 133 produces an output signal that varies in magnitude in accordance wtih the difference in the signals derived from a tap 157 on potentiometer 155, the end terminals of which are connected to a constant voltage source 159. The position of tap 157 is varied by servo motor 141. The servo motor drives the tap in such a direction as to minimize the output signal from amplifier 133. This is in accordance with standard practice and will not be further discussed herein.

The servo motor 141 also drives a cam 145 which is used to activate microswitches 147, 153 and 190. As shown, microswitch 147 has been activated to complete a circuit to terminal 33 so as to apply an electrical signal to line 121. When the cam turns clockwise as shown, at a subsequent time corresponding to an indication of a larger "minimum" torque from transducer 25, microswitch 153 will be tripped to apply an electrical signal to line 42 through terminal 41. When the cam turns further clockwise corresponding to an indication of a still larger "maximum" torque from transducer 25, microswitch 190 will be tripped to apply an electrical signal to line 43 through terminal 40. The circuits can be completed through ground and a source of power within the recorder controller (not shown) in the customary manner. Alternatively, the closure of microswitches 147, 153 and 190 can merely complete a circuit for activating or deactivating suitable circuits in the amplifier of FIG. 1 to which they are connected. This is in accordance with standard practice and will not be further discussed herein.

A signal of increasing magnitude applied to terminal 27 will produce a signal of corresponding amplitude on line 135 so as to produce an output signal from amplifier 133. Servo motor 141 will drive cam 145 clockwise and move stylus 161 across chart 165 in the direction shown by arrow 162. Potentiometer tap 157 will be moved in a direction to minimize the difference in the signals applied to amplifier 133 until zero error signal is produced from amplifier 133. If the output signal applied to amplifier 133 through lead 137 progressively increases in amplitude, microswitch 147 will be tripped and, at a later time, microswitch 153 will be tripped and thereafter microswitch 190 will be tripped. When the tongs 1 are released or backed off, servo motor 141 will drive cam 145 counterclockwise and move stylus 161 in a direction opposite to arrow 162. Microswitches 190, 153 and 147 will be opened in the order named.

Referring again to FIG. 1, a pulsing means, which may be a microswitch 125 having an actuating arm 127, is positioned near rotatable jaw member 2 so that the projections 3 will successively engage actuating arm 127 to momentarily close microswitch 125 as the rotatable jaw member 2 is driven by motor 5. The result is that a series of pulses will be transmitted to AND circuit 119 on line 123. Another pulsing means, which may be a microswitch 185 having an actuating arm 186, is positioned near actuator wheel 184 so that projections 4 will successively engage actuating arm 186 to momentarily close microswitch 185 as the wheels 183 and 184 rotate in response to rotation of coupling 181. The result is that a series of pulses will be transmitted to AND circuit 119' on line 123'. The output signals from recorder controller 37 appearing at terminal 33 are also transmitted to AND circuits 119 and 119' through line 121. The signal on line 121 is continuous in nature so that the outputs of AND circuits 119 and 119' on line 113 and line 113', respectively, are a series of pulses concomitant with the pulses applied to the AND circuits on lines 123 and 123'. The output pulses from AND circuits 119 and 119' are also applied to terminals 35 and 35', respectively, through lines 117 and 117', respectively, and to recording counters 187 and 188 through lines 117 and 117', respectively. Actuation of switch 147 (FIG. 2) serves to actuate relay 177. A suitable relay to be used as relay 177 is manufactured by Potter Brumfield, Preston, Ind.—Model KHP.

The output pulses from AND circuit 119 are applied to a counter means 75 having first, second and third output terminals 83, 85 and 87. The function of counter means 75 is to count the pulses from AND circuit 119 and to produce output signals at terminals 83, 85 and 87 after pulse counts of predetermined magnitude have been registered by the counter means. The pulse count required to produce an output signal at terminal 83 is less than the pulse count required to produce an output signal at terminals 85 and 87. Likewise, the pulse count required to to produce an output signal at terminal 85 is less than that required for terminal 87. A preferred pulse counter for this purpose comprises a pair of decade counters 91 and 111 having a plurality of output circuits which are successively energized by pulses applied thereto and which return to the initial state responsive to a pulse after the last circuit in the sequence has been energized. Pulses from AND circuit 119 applied to counter 111 will transfer conducting states from output circuit 107A through output circuit 107J in sequence. Only certain of the output circuits are designated by reference numerals to avoid unnecessary cluttering of the drawing. Likewise, the last output circuit 107J is connected to the input circuit of decade counter 91. The conducting states in the output circuits 99A through 99J are transferred successively, responsive to pulses from counter 111 appearing in output circuit 107J.

Selected ones of the output circuits 107A through 107J of counter 111 are connected to the input circuits of AND circuits 81, 79 and 77, the outputs of which are respectively connected to output terminals 83, 85 and 87. Likewise, selected ones of the output circuits 99A through 99J of counter 91 are connected to the other input circuits of AND circuits 81, 79 and 77. The means for selectively connecting the output circuits of the counters to the respective AND circuits may be multiposition switches having a wiper contact connected to a plurality of fixed contacts, the wiper contact being connected to an individual AND circuit input circuit and the fixed contacts being individually connected to each of the output circuits of a given counter. To avoid cluttering the drawing, such apparatuses are not illustrated in detail but are designated by switch members 93, 95, 97, 101, 103 and 105.

A pulse train applied to lead 113 will successively transfer conducting states down the series of output circuits from 107A to 107J, at which time an output pulse will be applied to decade counter 91 through lead 109. The conducting state of counter 91 will transfer to output circuit 99B. When an additional two pulses have been applied to decade counter 111, AND circuit 81 will be activated inasmuch as signals simultaneously will be applied thereto from output circuits 99B and 107C. This output pulse will correspond to a given rotation of jaw member 2 after a signal has been applied to AND circuit 119 from terminal 33. Likewise, after 2.2 revolutions of jaw member 2, a pulse will be produced by AND circuit 79, and after 3.9 revolutions of jaw member 2, a pulse will be produced by AND circuit 77.

The maximum torque output signal appearing at terminal 40 is applied through line 43 to OR circuit 67. The minimum torque output signal appearing at terminal 41 is applied through line 42 to an inhibitor circuit 71. This circuit will produce an output signal which will be applied on line 69 to OR circuit 67 until a pulse is applied thereto via line 73 from terminal 83. Terminal 41 is also connected via lines 42 and 63 to an input circuit of AND circuit 59. The other input circuit of AND circuit 59 is connected to terminal 85 through line 61. AND circuit 59 will produce an output signal responsive to a signal from terminal 85 provided that a signal is concurrently being received from terminal 41. The other input circuit of OR circuit 67 is connected through line 65 to terminal 87 so that the OR circuit will produce an output signal responsive to a signal from terminal 87.

Output signals from AND circuit 59 and OR circuit 67 respectively actuate switching circuits 54 and 57. Actuation of switching circuit 54 activates a constant frequency audio oscillator 52 which may have an output signal of 400 c.p.s. Actuation of switching circuit 57 activates a warble oscillator 55 which produces an output signal continuously variable in frequency; for example, a signal continuously swept back and forth between 500 and 1000 c.p.s. The output signals of the oscillators 52 and 55 are connected to a speaker or horn 45 through amplifier 49 and isolating resistors 51 and 53. The apparatus including the oscillators, the switching circuits 54 and 57, the horn 45, and amplifier 49 comprise an indicator means for producing a first output indication responsive to a signal in one input circuit thereof from OR circuit 67, and a second output indication responsive to a signal in a second input circuit thereof from AND circuit 59.

Another counter means 75' has the same components as and operates in a similar manner to the operation of counter means 75, and, for that reason, a recitation of the components of counter means 75' and a description of their operation will not be given in detail. Each component in counter means 75' is designated as a prime of the numeral used to designate the same component in counter means 75. These counter means differ in that counter means 75' measures rotation or travel of coupling 181 whereas counter means 75 measures the rotation or travel of jaw member 2. Thus, a pulse train applied to lead 113' will successively transfer conducting states down the series of output circuits from 107A' to 107J', at which time an output pulse will be applied to decade counter 91' through lead 109'. The conducting state of counter 91' will transfer to output circuit 99B'. When an additional two pulses have been applied to decade counter 111', AND circuit 81' will be activated inasmuch as signals simultaneously will be applied thereto from output circuits 99B' and 107C'. This output pulse will correspond to a given rotation of coupling 181 after a signal has been applied to AND circuit 119' from terminal 33. Likewise, after 2.2 revolutions of coupling 181, a pulse will be produced by AND circuit 79' and after 3.9 revolutions of coupling 181, a pulse will be produced by AND circuit 77'.

A manually actuated push button 89 is connected to counters 91, 111 and 91', 111' for the purpose of resetting the counters to their initial states whereat output circuits 99A, 107A, 99A' and 107A' are activated. Suitable decade counters may be a solid state device such as manufactured by the Accurate Instruments Company of Houston, Tex., and designated as Type OCB, or stepping switches such as are manufactured by Automatic Electric Company of Northlake, Ill., and designated as Type 44. An electrical power source will be connected to such a mechanical stepping switch in accordance with customary practice for mechanical counters of this type.

The operation of the apparatus described above is as follows:

Let it be assumed that the jaw member 2 of tongs 1 has been connected to a top pipe string section 180 and that line 9 supplying motor 5 has been connected to a suitable source of compressed air. Switch 189 is open so that counter means 75 is in operation and counter means 75' is not in operation. The operator will actuate mechanical counter means 15 for energizing relay 13 to open valve 11. Jaw member 2 will begin rotation to produce pulses on line 123. However, these pulses will not be effective to produce an output signal from AND circuit 119 until a predetermined reference torque is exerted by jaw member 2 so as to produce an output signal on line 121. Thereafter, AND circuit 119 will produce pulses which will be counted by counter means 75. When rotation of the box and pin members of the pipe sections being connected together are galled or dirty, a minimum torque signal greater than said reference torque signal will quickly appear on line 42 which will be transmitted through inhibitor 71 to OR circuit 67 to activate marble oscillator 55. The operator will then release control means 15 to de-energize motor 5. He will then thereupon actuate push button 89 to reset counters 91 and 111 to their original conditions and repair or replace the defective joint.

If the threads of top pipe 180 are not galled or dirty a pulse will appear on line 73 after a predetermined number of low turns of jaw member 2, e.g., 1.2 turns, to activate inhibitor 71 so that a signal on line 42 will not energize OR circuit 67 through line 69. Should the jaw member turn through an excessively large number of turns without building up to the desired minimum torque, as when a new coupling is engaging a new pipe 180 (or when a new box is engaging a new pin), and the threads thereof are not properly mated, an output signal will be produced at terminal 87 after pipe section 180 has been rotated through a given number of maximum turns, e.g., 7.8 turns. Again, this will produce an output signal from OR circuit 67 to activate the "reject" warble oscillator 55. In addition, if the predetermined maximum torque is reached before the predetermined number of low turns of jaw member 2, an output signal from OR circuit 67 will be produced to activate the "reject" warble oscillator 55. However, if the desired minimum torque builds up after a pulse appears at terminal 87, signals will simultaneously by applied to the input circuits of AND circuit 59 through leads 63 and 61 when pipe 180 has been rotated through a given number of intermediate turns, e.g., 4.5 turns. This produces an output signal from AND circuit 59 to activate constant frequency oscillator 52 so that the operator will know that the joint is properly made up whereupon motor 5 is activated by closing valve 11.

In summary, when making up pipe, the "reject" signal from warble oscilator 55 occurs under any one of the following conditions:

(1) Where a predetermined maximum number of turns occurs before a predetermined minimum torque is reached; or
(2) Where a predetermined maximum torque is reached before a predetermined intermediate number of turns is reached; or
(3) Where said minimum torque is reached before a predetermined number of low turns is reached.

And the "accept" signal for constant frequency oscillator 52 occurs when:

(1) Said minimum torque is reached on or after said intermediate number of turns is reached but before said maximum number of turns is reached; or
(2) Said intermediate number of turns is reached on or after said minimum torque is reached but before said maximum torque is reached.

When switch 189 has been closed, rotations of coupling 181 are counted and recorded and used to signal acceptance or rejection of the threaded connection between coupling 181 and pipe section 182 similar to the manner in which rotations of pipe 180 are counted and recorded and used to signal acceptance or rejection of the threaded connection between pipe section 180 and coupling 181.

Thus, if the threads of coupling 181 and pipe section 182 are not galled or dirty, a pulse will appear on line 73' after a predetermined number of low turns of jaw member 2, e.g., 0.6 turn, to activate inhibitor circuit 71 so that a signal on line 42 will not energize OR circuit 67 through line 69. Should the coupling 181 turn through an excessively large number of turns without building up to the desired minimum torque as when a new coupling is engaging a new pipe 182, and the threads thereof are not properly mated, an output signal will be produced at terminal 87' after coupling 181 has been rotated through a given number of maximum turns, e.g., 3.9 turns. Again, this will produce an output signal from OR circuit 67 to activate the warble oscillator 55. Again, if the threaded coupling 181 pipe section 182 connection produces a maximum torque before low turns of coupling 181 are reached, an output signal from OR circuit 67 will be produced to activate the warble oscillator 55. However, if the desired minimum torque builds up after a pulse appears at terminal 83' and before a pulse appears at terminal 87', signals will simultaneously be applied to the input circuits of AND circuit 59 through leads 63 and 61' when the pipe has been rotated through a given number of turns, e.g., 2.2 turns. This produces an output signal from AND circuit 59 to activate constant frequency oscillator 52 so that the operator will know that the joint is properly made up whereupon motor 5 is activated by closing valve 11.

Counters 187 (top pipe 180) and counter 188 (bottom pipe 182) are used along with chart 165 if necessary to determine whether the top or bottom pipe, or both, are causing the rejection signal(s).

An alternate operating arrangement is the elimination of the AND circuits 81' and 77' and attachment of switch member 95' and the AND circuit 79' directly into AND circuit 79. This enables the automatic stepping of the AND circuit 79 for each incremental amount of makeup of the coupling (bottom connection) indicated by means of counter means 75. For this arrangement, the four settings for pipe makeup may be as follows:

Counter means 75':                                   Turns
    Intermediate turns setting ------------------ 2.2
Counter means 75:
    Low turns setting ------------------------ 1.2
    Intermediate turns setting ------------------ 2.2
    Maximum turns setting -------------------- 7.8

For example, when the bottom is made up to 2.2 turns the AND circuit 79 would be stepped to 4.5 turns to guarantee the 2.2 turns setting on the top.

Another alternate operating arrangement is attachment of switch 93' and AND circuit 81' directly into AND circuit 81; switch 95' and AND circuit 79' directly into AND circuit 79; and switch 97' and AND circuit 77' directly into AND circuit 77. This arrangement enables the automatic stepping of AND circuits 81, 79 and 77 for each incremental amount of makeup of the coupling (bottom connection) indicated by means of counter means 75'. For this arrangement, the six settings for pipe makeup may be as follows:

Counter means 75':                                   Turns
    Low turns setting ------------------------ 0.6
    Intermediate turns setting ------------------ 2.2
    Maximum turns setting -------------------- 3.9
Counter means 75:
    Low turns setting ------------------------ 0.6
    Intermediate turns setting ------------------ 2.2
    Maximum turns setting -------------------- 3.9

In order to determine the optimum number of turns required for optimum makeup, the following equation is used.

$$N = \frac{\sigma_y(c^2 - a^2)(b)}{E(c^2 - b^2)TP}$$

Where:

$N$ = number of turns
$\sigma_y$ = yield strength of the material of the coupling members
$c$ = outside diameter of the female member of the coupling
$b$ = pitch diameter
$a$ = inside diameter of the male member
$E$ = Young's Modulus of Elasticity
$T$ = taper of the threads
$P$ = pitch of the threads In FIG. 3 there is shown a modification of the invention wherein the first output indication referred to above is the closure of valve 11 to automatically cut off power to motor 5. The output of switching circuit 57 is applied directly to valve actuating means 15 to close valve 11 when an output signal is applied to the switching circuit 57 from OR circuit 67. Switching circuit 57 may be normally closed so that the operator can close a contact to energize the control winding of relay 13 by actuating a push button 15A in series circuit relationship with the switching circuit 57. The output signal from OR circuit 67 or AND circuit 59 will open switching circuit 57 to de-energize the control winding of relay 13 and close valve 11.

When the method of pipe makeup to be used is double end makeup with the coupling 181 floating switch 189 would be in its closed position (not shown), and when the method of pipe makeup is single end makeup switch 189 would be in its open position, as shown.

The operating efficiencies and advantages resulting from this invention are:

(1) Absence of connection leakage.
(2) Elimination of need for pressure testing.
(3) Time required to pressure test is saved.
(4) Use of API and other nonpremium connections are permitted in high-pressure critical services.
(5) The trial and error approach used in the past for tubular goods makeup is replaced with an effective method of eliminating connection leaks.

Having fully described the apparatus, operation, objects and advantages of my invention, I claim:

1. A method for making up pipe sections having mating threaded ends comprising:
   threadedly interengaging said pipe section ends until a predetermined reference torque is required to further threadedly interengage said pipe section ends;
   thereafter further threadedly interengaging said pipe section ends; and
   discontinuing said further threaded interengagement of said pipe section ends upon occurrence of one of the following:
   (a) attainment of a predetermined maximum number of turns before a predetermined minimum torque, greater than said reference torque, is reached; or
   (b) attainment of a predetermined maximum torque, greater than said minimum torque, before a predetermined intermediate number of turns, less than said maximum number of turns, is reached; or
   (c) attainment of said minimum torque before a predetermined number of low turns, less than said intermediate number of turns, is reached; or
   (d) attainment of said minimum torque on or after said intermediate number of turns is reached but before said maximum number of turns is reached; or
   (e) attainment of said intermediate number of turns on or after said minimum torque is reached but before said maximum torque is reached.

2. A method as recited in claim 1 wherein said pipe sections are well pipe sections.

3. A method for making up two pipe section ends to a coupling comprising:
   threadedly interengaging one end of one of said pipe sections and one end of said coupling and one end of said other pipe section and the other end of said coupling until a predetermined reference torque is required to further threadedly interengage said pipe section ends and said coupling;
   thereafter further threadedly interengaging said pipe section ends and said coupling; and
   discontinuing said further threaded interengagement of said pipe section ends and said coupling upon occurrent of one of the following:
   (a) attainment of a predetermined maximum number of turns of said one pipe section before a predetermined minimum torque, greater than said reference torque, is reached; or
   (b) attainment of a predetermined maximum number of turns of said coupling before a predetermined minimum torque, greater than said reference torque, is reached; or
   (c) attainment of said minimum torque before a predetermined number of low turns of said one pipe string, less than said intermediate number of turns of said one pipe string, is reached; or
   (d) attainment of said minimum torque before a predetermined number of low turns of said coupling, less than said intermediate number of turns of said coupling, is reached; or
   (e) attainment of said minimum torque on or after said intermediate number of turns is reached but before said maximum number of turns of said one pipe string is reached; or
   (f) attainment of said minimum torque on or after said intermediate number of turns is reached but before said maximum number of turns of said coupling is reached; or
   (g) attainment of said intermediate number of turns of said one pipe string on or after said minimum torque is reached but before said maximum torque is reached; or
   (h) attainment of said intermediate number of turns of said coupling on or after said minimum torque is reached but before said maximum torque is reached.

4. A method as recited in claim 3 in which said pipe sections are well pipe sections and said coupling is floated on at a well site.

5. A method as recited in claim 3 in which said further threaded interengagement is also discontinued upon the occurrence of one of the following:
   (a) attainment of a predetermined maximum torque greater than said minimum torque before a predetermined intermediate number of turns of said one pipe section, less than said maximum number of turns of said one pipe section, is reached; or
   (b) attainment of a predetermined maximum torque greater than said minimum torque before a predetermined intermediate number of turns of said coupling, less than said maximum number of turns of said coupling, is reached.

6. A method as recited in claim 5 wherein said predetermined number of turns for said low, intermediate and maximum number of turns for said one pipe string is different from said predetermined number of turns of said low, intermediate and maximum number of turns for said coupling.

7. A method for making up pipe sections having mating threaded ends comprising:
   threadedly interengaging said pipe section ends while measuring torque required to turn one of said pipe sections relative to the other until a predetermined reference torque is reached;
   thereafter threadedly interengaging said pipe section ends while counting the number of turns of said one pipe string and while continuing to measure said torque; and
   discontinuing said further threaded interengagement of said pipe section ends upon occurrence of one of the following:
   (a) attainment of a predetermined maximum number of turns before a predetermined minimum torque, greater than said reference torque, is reached; or
   (b) attainment of a predetermined maximum torque, greater than said minimum torque before a predetermined intermediate number of turns, less than said maximum number of turns, is reached;

(c) attainment of said minimum torque before a predetermined number of low turns, less than said intermediate number of turns, is reached; or (d) attainment of said minimum torque on or after said intermediate number of turns is reached but before said maximum number of turns is reached; or (e) attainment of said intermediate number of turns on or after said minimum torque is reached but before said maximum torque is reached.

8. A method as recited in claim 7 in which said pipe sections are well pipe sections.

9. A method for making up two pipe sections to a coupling comprising:

threadedly interengaging one end of one of said pipe sections and one end of said coupling and one end of said other pipe section and the other end of said coupling;

rotating said one pipe section to make up the two pipe section-coupling connection while measuring the torque required to rotate said one pipe section until a predetermined reference torque is reached;

further rotating said one pipe section to make up said connection while counting the number of turns of said one pipe section and the number of turns of said coupling; and discontinuing rotation of said one pipe section upon occurrence of one of the following;

(a) attainment of a predetemined maximum number of turns of said one pipe section before a predeterined minimum torque, greater than said reference torque, is reached; or (b) attainment of a predetermined maximum number of turns of said coupling before a predeterined minimum torque, greater than reference torque, is reached; or (c) attainment of said minimum torque before a predetermined number of low turns of said one pipe string less than said interediate number of turns of said one pipe string, is reached; or (d) attainment of said minimum torque before a predetermined number of low turns of said coupling, less than said interediate number of turns of said coupling, is reached; or (e) attainment of said minimum torque on or after said intermediate number of turns is reached but before said maximum number of turns of said one pipe string is reached; or (f) attainment of said minimum torque on or after said intermediate number of turns is reached but before said maximum number of turns of said coupling is reached; or (g) attainment of said intermediate number of turns of said one pipe string on or after said minimum torque is reached but before said maximum torque is reached; or (h) attainent of said intermediate number of turns of said coupling on or after said minimum torque is reached but before said maximum torque is reached.

10. A method as recited in claim 9 in which said pipe sections are well pipe sections and said coupling is floated on at a well site.

11. A method as recited in claim 9 in which said further threaded interengagement is also discontinued upon the occurrence of one of the following:

(a) attainment of a predetermined maximum torque greater than said minimum torque before a predetermined intermediate number of turns of said one pipe section, less than said maximum number of turns of said one pipe section, is reached; or (b) attainment of a predetermined maximum torque greater than said minimum torque before a predetermined intermediate number of turns of said coupling, less than said maximum number of turns of said coupling is reached.

12. A method as recited in claim 11 wherein said predetermined number of turns for said low, intermediate and maximum number of turns for said one pipe string is different from said predetermined number of turns of said low, intermediate and maximum number of turns for said coupling.

13. A method for making up two pipe sections to a coupling comprising:

threadedly interengaging one end of one of said pipe sections and one end of said coupling and one end of said other pipe sectio and the other end of said coupling;

rotating said one pipe section to make up the two pipe section-coupling connection while measuring the torque required to rotate said one pipe section until a predetermined reference torque is reached;

further rotating said one pipe section to make up said connection while counting the number of turns of said one pipe section and the number of turns of said coupling; and discontinuing rotation of said one pipe section upon occurrence of one of the following:

(a) attainment of a predetermined maximum number of turns of said one pipe section before a predetermined minimum torque, greater than said reference torque, is reached; or (b) attainment of a predetermined maximum number of turns of said coupling before a predetermined minimum torque, greater than said reference torque, is reached; or (c) attainment of said minimum torque before a predetermined number of low turns of said one pipe string, less than said intermediate number of turns of said one pipe string, is reached; or (d) attainment of said minimum torque on or after said intermediate number of turns is reached but before said maximum number of turns of said one pipe string is reached; or (e) attainment of said intermediate number of turns of said one pipe string on or after said minimum torque is reached but before said maximum torque is reached.

14. A method as recited in claim 13 in which said further threaded intergengagement is also discontinued upon the occurrence of attainment of said minimum torque before aa predetermined number of low turns of said coupling, less than said intermediate number of turns of said coupling, is reached.

15. A method as recited in claim 13 in which said further threaded interengagement is also discontinued upon the occurrence of attainment of said minimum torque on or after said intermediate number of turns is reached but before said maximum number of turns of said coupling is reached.

16. A method as recited in claim 13 in which said further threaded interengagement is also discontinued upon the occurrence of attainment of said intermediate number of turns of said coupling on or after said minimum torque is reached but before said maximum torque is reached.

17. A method as recited in claim 13 in which said further threaded interengagement is also discontinued upon the occurrence of one of the following:

(a) attainment of a predetermined maximum torque greater than said minimum torque before a predetermined intermediate number of turns of said one pipe section, less than said maximum number of turns of said one pipe section, is reached; or (b) attainment of a predetermined maximum torque greater than said minimum torque before a predetermined intermediate number of turns of said coupling, less than said maximum number of turns of said coupling, is reached.

References Cited

UNITED STATES PATENTS

| | | | |
|---|---|---|---|
| 2,527,456 | 10/1950 | Schmeling | 73—139 |
| 2,756,622 | 7/1956 | La Belle | 73—139 |
| 3,368,396 | 2/1968 | Van Burkleo et al. | 73—139 |

OTHER REFERENCES

Article in March 1967 issue of Journal of Petroleum Technology, pp. 337–343 titled New Technology for Improved Tubular Connection Performance, by P. D. Weiner and F. O. Sewell. This paper did not include the variances torque responsive components claimed in this instant application along with the new control system.

JOHN F. CAMPBELL, Primary Examiner

D. P. ROONEY, Assistant Examiner

U.S. Cl. X.R.

73—139